United States Patent [19]

Maggi

[11] 4,407,741

[45] * Oct. 4, 1983

[54] HYDROTROPIC CLEANER

[75] Inventor: Richard D. Maggi, Oyster Bay, N.Y.

[73] Assignee: Life Industries Corporation, Old Bethpage, N.Y.

[*] Notice: The portion of the term of this patent subsequent to Mar. 8, 2000 has been disclaimed.

[21] Appl. No.: 343,027

[22] Filed: Jan. 27, 1982

Related U.S. Application Data

[63] Continuation-in-part of Ser. No. 937,327, Aug. 28, 1978, abandoned.

[51] Int. Cl.$^3$ .................. C11D 1/70; C11D 1/825; C11D 3/28; C11D 3/43
[52] U.S. Cl. .................................. 252/542; 134/40; 252/153; 252/173; 252/174.14; 252/174.22; 252/DIG. 1; 252/DIG. 14
[58] Field of Search ........... 252/542, 153, 173, 174.14, 252/174.22

[56] References Cited

U.S. PATENT DOCUMENTS

| | | | |
|---|---|---|---|
| 3,806,460 | 4/1974 | Mukai | 252/111 |
| 3,948,819 | 4/1976 | Wilde | 252/545 |
| 3,983,078 | 9/1976 | Collins | 252/540 |

Primary Examiner—Dennis L. Albrecht
Attorney, Agent, or Firm—DeLio and Libert

[57] ABSTRACT

A cleaner which is particularly suited for use as a bilge cleaner comprises (a) methyl-2 pyrrolidone, (b) an alkylaryl polyether alcohol obtainable as the reaction product of octylphenol and ethylene oxide and containing an average of five ethylene oxide units per molecule, and (c) an alkylaryl polyether alcohol obtainable as the reaction product of octylphenol and ethylene oxide and containing an average of seven to eight ethylene oxide units per molecule. One or more of defoaming and color agents and a fragrance component are included in preferred embodiments of the invention.

11 Claims, No Drawings

HYDROTROPIC CLEANER

CROSS REFERENCE TO RELATED APPLICATIONS

This application is a continuation in part of application Ser. No. 937,327 of Richard D. Maggi for "Hydrotropic Bilge Cleaner", filed Aug. 28, 1979, now abandoned.

BACKGROUND OF THE INVENTION

The present invention relates to a hydrotropic cleaner which has particular utility in the dispersing and removal of oil and grease contained in water and therefore finds specific utility for specialized uses such as the cleaning of the bilges of boats and vessels generally. Obviously, the invention has other cleaning uses and is particularly suited to the cleaning and removal of oil and greasy substances generally.

A major concern in the marine industry is the dispersing and absorption of engine, crankcase and diesel oil into an aqueous solution in order to permit removal of the oils with the removal of the bilge water. Bilge water is that water, either fresh or saline, such as salt ocean water, which accumulates in the bilge of boats by either rain, or salt or fresh water taken on underway, or by the washing of the boat with either fresh or salt water. The oil that is either spilled or leaked from internal combustion or outboard engines enters the bilge and contacts the water in the bilge. As oil and water do not mix, the oil lies on the surface of the bilge water and becomes difficult to remove since it is floating on the water surface.

A complication in the formulation of bilge cleaners is that they cannot utilize a volatile solvent base since such would create a hazard to normal operation of the boat due to harmful vapors and flammability. Further, the absorption of the oil and water into a dispensible cleaning solution must present no environmental objections to disposal, such as the cleaner containing significant amounts of phosphates. Biodegradability of the cleaner is highly desirable, if not necessary. Once the oil is absorbed and dispersed in the aqueous solution the cleaning composition must perform the function of cleaning the bilge as well as removing dirt and grime which lies in the area covered by bilge water. Lastly, it is desirable that the bilge be deodorized by the cleaning compositions so as to remove unpleasant oil odor residue.

The novel techniques of one aspect of this invention permit the formulation to be poured (liquid) into the bilge of a boat which contains either fresh or salt (sea) water and so absorb and disperse oil such as used in internal combustion engines, both gasoline and diesel, while cleaning the residue of dirt and grime of the bilge water as well. An added feature is that the formulation of the present invention contains no phosphates and is biodegradable. A deodorizing of the bilge area can also be attained by fragrance components. The solution is further non-flammable and presents no explosive characteristics as well as being non-offensive and non-toxic when coming into contact with engines which develop high operating temperatures. The formulation offers long term suspension and dispersion of the oil in the aqueous solution in excess of 90 days.

A method of absorbing oil into water and suspending it therein is provided, which permits easy removal of the oil due to its emulsified state. The bilge cleaning composition of the present invention permits cleaning of areas covered by water, such as boat bilges, whereby the dirt and grime are easily removed by the composition. The composition may be used as a liquid, either dilute or full strength. The addition of a fragrance component enables better deodorizing, which is useful in bilge areas to remove the oily, greasy odors normally present in boat bilges. Used either dilute or full strength, the liquid composition of the invention is useful for cleaning areas such as bilge areas to free the same from the musty odors associated with boat bilges. It obviously has utility for cleaning and deodorizing generally, such as for deodorizing fish bait wells, and as a cleaner, whether dilute or full strength, for fiber glass and wood painted surfaces, for sail cloth materials such as dacron and nylon, for asphalt flooring, vinyl flooring, linoleum flooring and vinyl asbestos flooring, for plastic laminates such as those sold under the trademark FORMICA, for polyvinyl chloride and ABS (acrylonitrile-butadiene-styrene) plastics, for degreasing machine and engine parts made of aluminum or other metal, for cleaning painted dry wall construction material and for the purpose of removing grease and grime from quartz glass.

The formulation of the invention can be poured into the bilge of any boat without affecting the sealants, coatings, adhesives, machine works or fastenings and provides a method of dispersing oil, such as bilge oil, into an aqueous medium, either fresh or saline.

One object of the present invention is to offer in one singular formulation the function of oil absorption, oil suspension, cleaning, and, optionally, deodorizing in an aqueous solution heretofore unavailable as a single step application.

Another object of the invention is to provide a new and improved composition which is a superior cleanser and is particularly adapted for use as a bilge cleaner.

Another object of the invention is to provide a method of cleaning bilges generally, using the composition, and not only boat bilges but any areas (such as stationary engine or heating plant rooms, sump areas, etc.) where oily or greasy water may accumulate.

SUMMARY OF THE INVENTION

In accordance with the present invention there is provided a cleaning composition comprising (a) methyl-2-pyrrolidone, (b) an alkylaryl polyether alcohol obtainable as the reaction product of octylphenol and ethylene oxide and containing an average of five ethylene oxide units per molecule and (c) an alkylaryl polyether alcohol obtainable as the reaction product of octylphenol and ethylene oxide and containing an average of seven to eight ethylene oxide units per molecule.

In accordance with certain aspects of the invention the composition further includes one or more of a defoaming agent, a color agent and a fragrance component.

In one aspect, the invention provides for further including water in the compositions, preferably up to about 20 parts by weight of water to one part by weight of the balance of the composition. The composition, in a preferred aspect, comprises 35.8 to 43.8 parts by weight of alkylaryl octyl phenoxy polyepoxy polyether alcohol containing an average of five ethylene oxide units per molecule and 21.8 to 26.6 parts by weight of alkylaryl octyl phenoxy polyepoxy polyether alcohol containing an average of 7 to 8 groups of ethylene oxide per molecule and 5.8 to 7.2 parts by weight of methyl-2-pyrrolidone.

(Thus, in the preferred composition, the weight ratio of methyl-2-pyrrolidone to the aforesaid polyether alcohol containing an average of 7 to 8 groups of ethylene oxide per molecule is about 0.22 to 0.33 (5.8/26.6 to 7.2/21.8). The composition preferably may also contain up to about 20 parts by weight water and up to about 0.9 parts by weight, i.e., 0 to 0.9 parts by weight, of sodium bicarbonate.

The invention also provides a method for cleaning the bilge area of boats comprising introducing into the bilge area a bilge cleaning composition comprising (a) methyl-2 pyrrolidone, (b) an alkylaryl polyether alcohol obtained as the reaction product of octylphenol and ethylene oxide and containing an average of five ethylene oxide units per molecule and (c) an alkylaryl polyether alcohol obtained as the reaction product of octylphenol and ethylene oxide and containing an average of seven to eight ethylene oxide units per molecule, and maintaining the boat afloat on a body of water whereby the natural rocking and pitching motion of the boat on the water sluices said cleaning composition about the bilge. The method may include diluting the composition with up to about 20 parts by weight of water.

A combination of specific nonionic alkylphenyl polyether alcohols with other ingredients as described herein has been found to provide a highly effective cleaning composition. The polyether alcohols, commonly referred to as alkylaryl polyether alcohols, which are used in the present invention can be, and usually are, prepared by the reaction of octylphenol with ethylene oxide. Their structural formula may be represented by

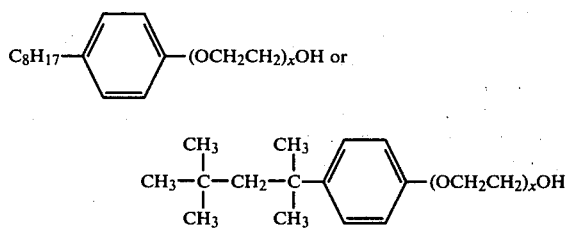

in which formula x is the average number of ethylene oxide units in the ether side chain. Such compounds are commercially available and are known for use in detergent compositions. For example, Rohm and Haas Company of Philadelphia, Pa. sells such compositions under the trademark TRITON. Different grades of the product are commercially available, including one with an average of five ethylene oxide units (TRITON X-45) and seven to eight ethylene oxide units (TRITON X-114). See the Rohm and Haas copyrighted brochure entitled "TRITON SURFACE-ACTIVE AGENTS—Nonionic Alkylphenyl Polyether Alcohols" (1977).

In accordance with certain aspects of the invention, the two grades of alkylaryl polyether alcohols may be present in equal amounts or the five-average ethylene oxide unit grade may be present in a weight ratio to the seven to eight average ethylene oxide unit grade of about 1.35 to 2.01:1, preferably 1.5 to 2:1.

As used herein and in the claims, the term "fragrance agent" preferably refers to any suitable odorant. To be suitable, the odorant should be one which, in addition to providing a pleasant or desired odor to the composition, preferably is persistent enough to linger after the cleaning composition has been rinsed away, and the odorant should be one which will not substantially adversely interfere with the cleansing, detergent, or deoxidizing action of the composition. Many such odorants are well known in the art and are commonly used in household cleaners and the like. Generally, balsamic, pine, and lemon type odorants are preferred.

As used herein and in the claims, the term "defoaming agent" means any suitable substance which is used to reduce foaming tendency of the composition. By "suitable" is meant a defoaming agent which will not substantially adversely interfere with the cleansing, detergent or deoxidizing action of the composition. Such defoaming agents are well known in the art and used in products and processing in a variety of industries. Typical examples are 2-octanol, sulfonated oils, organic phosphates, silicone fluids, dimethylpolysiloxane, etc.

Ethylene glycol monobutyl ether is commercially available, for example, it is sold under the trademark Butyl Cellosolve by Union Carbide Corporation.

Generally, each of the ingredients in the composition is present in an amount at least sufficient to render the ingredient effective. Without wishing to necessarily be bound thereby, it is believed that the methyl-2 pyrrolidone acts as a solvent, and the two alkylaryl polyether alcohols act as emulsifiers/wetting agents. The specific combinations of alkylaryl polyether alcohols have been found to provide a particularly effective combination when used in conjunction with the other ingredients. The sodium bicarbonate is useful to provide a small (carbon dioxide) positive pressure above the compositions where it is packaged in containers such as plastic bottles or jars. Other ingredients which do not substantially adversely affect the cleaning properties of the composition may also be added, eg., color tints.

DETAILED DESCRIPTION OF PREFERRED EMBODIMENTS

The present invention makes use of two specific oil-soluble, nonionic surface-active agents, chemically described as indicated above as alkylaryl polyether alcohols which are useful as emulsifiers and welting agents which, in the specified combination provide (a) emulsifier activity for oil-water systems;

(b) surfactant activity to increase detergency, dispersibility and provide wetting action;

(c) activity as an agent for modifying the surfactant solubility characteristics.

The ability to reduce interfacial tension between water and oils is an important factor in the effective operation of the cleaning composition of the invention. The information of stable emulsions is a critical aspect for the surface active agents used. With water as one of the liquids, two types of emulsions are possible; oil-in-water and water-in-oil. The term oil in emulsion technology, and as used herein, is used to describe generally an organic liquid sparingly soluble or insoluble in water. Hydrocarbon fuels such as gasoline and diesel fuel, greases and lubricants are included in the definition. The emulsion is formed by physically extending one phase in the other by shaking, mixing, or stirring. The extended phase collapses into small spheres as a result of the shearing action imposed upon it. The emulsifiers have two principal functions; (a) to decrease the interfacial tension between the liquids, enabling easier formation of the greatly extended interface, and (b) to stabilize the dispersed phase against coalescence once it formed. An important property of surface-active agents is their ability to improve the rate and degree of wetting of various surfaces by water, particularly oily and greasy surfaces which are otherwise wettable only with difficulty. Rapid wetting of the substrate with the aqueous phase is provided by the emulsifiers.

The combination of ingredients in the formulation of the present invention allows superior cleaning efficiency due to the ability of the nonionic surfactants utilized to solubilize oils. The fragrance additive permits a deodorizing effect capable of rendering the bilge or other cleaned area free of unpleasant oil (or other) odor. The deodorant-fragrance preferably used is also effective, for example, in the removal of fish odors from live bait wells and fish boxes.

The cleaning composition of the invention provides a liquid which can be poured into the bilge of a boat with an approximate mixture of 20 parts water to one part cleaner. The rocking, rolling motion of the boat is sufficient to allow the formulation to thoroughly emulsify and clean the bilge area. The composition can also be used as a conventional cleaning composition and is particularly effective in cleaning oily or greasy dirt from surfaces generally.

The formulation is a unique hydrotropic, aqueous formulation which utilizes nonionic surface agents preferably coupled with a defoamer, deodorizer and a color agent to cleanse surfaces generally and which is particularly effective for cleaning oils and greases such as are encountered in the bilge of boats. The following is an example of a preferred embodiment.

EXAMPLE

| pounds | |
|---|---|
| trace | Color Agent - PLYACERD-FDNC#1 Blue, manufactured by PYLAM PRODUCTS, INC. |
| 5 | Fragrance Agent - FRAGRANCE-8918 Z, manufactured by INTERNATIONAL FAVORS AND FRAGRANCES, INC. |
| 398 | Liquid alkyl aryl (reaction product of octylphenol and ethylene oxide) polyether alcohol with 5 groups of ethylene oxide per molecule, manufactured by ROHM & HAAS COMPANY (Triton X-45). |
| 242 | Liquid alkyl aryl (reaction product of octylphenol and ethylene oxide) alcohol with 7-8 groups of ethylene oxide per molecule, manufactured by ROHM & HAAS COMPANY (Triton X-114). |
| 11 | Defoamer Agent - NOPCO-NXZ manufactured by DIAMOND SHAMROCK CHEMICAL COMPANY. |
| 65 | Solvent - Methyl-2 pyrrolidone, manufactured by G.A.F. CORPORATION. |

-continued

| pounds | |
|---|---|
| 5,089 | Water |

The alkylaryl polyether alcohols specified for use in the invention may of course be prepared by any suitable technique. Generally, they are in fact obtained by reaction of octylphenol and ethylene oxide and accordingly are described as "obtainable" by such reaction.

What is claimed is:

1. A cleaning composition comprising (a) about 0.22 to 0.33 parts by weight of methyl-2 pryyolidone, (b) about 1.5 to 2 parts by weight of an alkylaryl polyether alcohol obtainable as the reaction product of octylphenol and ethylene oxide and containing an average of five ethylene oxide units per molecule and (c) one part by weight of an alkylaryl polyether alcohol obtainable as the reaction product of octylphenol and ethylene oxide and containing an average of seven to eight ethylene oxide units per molecule.

2. The composition of claim 1 further including water.

3. The composition of claim 1 further including a fragrance component and a defoaming agent.

4. The composition of claim 1 further including 0 to 0.9 parts by weight of sodium bicarbonate.

5. The composition of claim 1 or claim 2 including a defoaming agent.

6. The composition of claim 1 or claim 2 further including a fragrance component.

7. The composition of claim 2 containing up to about 20 parts by weight of water to one part by weight of the balance said composition.

8. A cleaning composition comprising (a) 5.8 to 7.2 parts by weight of methyl-2 pyrrolidone, (b) 35.8 to 43.8 parts by weight of an alkylaryl polyether alcohol obtainable as the reaction product of octylphenol and ethylene oxide and containing an average of five ethylene oxide units per molecule and (c) 21.8 to 26.6 parts by weight of an alkylaryl polyether alcohol obtainable as the reaction product of octylphenol and ethylene oxide and containing an average of seven to eight ethylene oxide units per molecule.

9. The composition of claim 8 containing up to 20 parts by weight water to one part by weight of the balance of said composition.

10. The composition of claim 8 or claim 9 further including a fragrance component and a defoaming agent.

11. The composition of claim 8 or claim 9 further including 0 to 0.9 parts by weight of sodium bicarbonate.

* * * * *

UNITED STATES PATENT AND TRADEMARK OFFICE
CERTIFICATE OF CORRECTION

PATENT NO. : 4,407,741

DATED : October 4, 1983

INVENTOR(S) : Richard D. Maggi

It is certified that error appears in the above–identified patent and that said Letters Patent are hereby corrected as shown below:

Column 1, Line 8 replace "1979" with --1978--

Column 3, Line 65 replace "preferably" with --generally--

Signed and Sealed this

Twenty-ninth Day of November 1983

[SEAL]

Attest:

GERALD J. MOSSINGHOFF

Attesting Officer     Commissioner of Patents and Trademarks